United States Patent
Sinha et al.

(10) Patent No.: US 10,088,974 B2
(45) Date of Patent: Oct. 2, 2018

(54) SUMMARIZATION AND COMMUNICATION OF LARGE DATA SETS

(71) Applicant: Adobe Systems Incorporated, San Jose, CA (US)

(72) Inventors: Ritwik Sinha, Kolkata (IN); Piyush Kumar, Kota (IN); Amerineni Rohith, Hyderbad (IN); Rajat Kateja, Jaipur (IN)

(73) Assignee: Adobe Systems Incorporated, San Jose, CA (US)

(*) Notice: Subject to any disclaimer, the term of this patent is extended or adjusted under 35 U.S.C. 154(b) by 356 days.

(21) Appl. No.: 14/162,702

(22) Filed: Jan. 23, 2014

(65) Prior Publication Data
US 2015/0205449 A1    Jul. 23, 2015

(51) Int. Cl.

| | |
|---|---|
| *G06F 17/00* | (2006.01) |
| *G06F 17/20* | (2006.01) |
| *G06F 17/21* | (2006.01) |
| *G06F 17/22* | (2006.01) |
| *G06F 17/24* | (2006.01) |
| *G06F 17/25* | (2006.01) |
| *G06F 17/26* | (2006.01) |
| *G06F 17/27* | (2006.01) |
| *G06F 17/28* | (2006.01) |
| *G06F 3/0482* | (2013.01) |
| *G06F 17/30* | (2006.01) |
| *H04L 29/08* | (2006.01) |
| *H04L 29/06* | (2006.01) |

(52) U.S. Cl.
CPC ........ *G06F 3/0482* (2013.01); *G06F 17/3089* (2013.01); *G06F 17/30994* (2013.01); *H04L 67/02* (2013.01); *H04L 67/22* (2013.01); *H04L 67/42* (2013.01)

(58) Field of Classification Search
CPC ........... G06F 17/3089; G06F 17/30994; G06F 3/0481
USPC ........................................................ 715/234
See application file for complete search history.

(56) References Cited

U.S. PATENT DOCUMENTS

| | | | | |
|---|---|---|---|---|
| 6,078,913 | A * | 6/2000 | Aoki | G06F 17/30864 |
| 6,393,479 | B1 * | 5/2002 | Glommen | G06Q 30/02 |
| | | | | 709/219 |
| 6,697,802 | B2 * | 2/2004 | Ma | G06F 17/30595 |
| 7,917,382 | B2 * | 3/2011 | Cereghini | G06Q 30/02 |
| | | | | 705/7.29 |
| 8,620,933 | B2 * | 12/2013 | Holmes | G06Q 30/0242 |
| | | | | 707/752 |

(Continued)

*Primary Examiner* — Stephen Hong
*Assistant Examiner* — Nicholas Hasty
(74) *Attorney, Agent, or Firm* — Kilpatrick Townsend & Stockton LLP

(57) ABSTRACT

Techniques for providing information about large data sets may be provided. For example, a summary of the data sets and of patterns between the data sets may be presented. Traffic associated with a network-based resource that includes a number of documents may be an example of large data sets. The traffic may be analyzed and traffic patterns may be determined. A structure may be generated based on the traffic patterns and may use nodes to represent the documents. Further, a visualization of the structure may be presented. The visualization may include recursive clusters of the nodes, where the clusters may be labeled based on the respective clustered nodes.

20 Claims, 12 Drawing Sheets

(56) References Cited

U.S. PATENT DOCUMENTS

| | | | |
|---|---|---|---|
| 8,650,492 B1* | 2/2014 | Mui | G06F 17/30873 |
| | | | 715/736 |
| 8,782,166 B1* | 7/2014 | Deshpande | G06Q 30/0246 |
| | | | 709/217 |
| 2002/0070953 A1* | 6/2002 | Barg | G06Q 30/02 |
| | | | 715/700 |
| 2003/0107575 A1* | 6/2003 | Cardno | G06Q 30/02 |
| | | | 345/440 |
| 2003/0128231 A1* | 7/2003 | Kasriel | G06F 17/3089 |
| | | | 715/736 |
| 2010/0280965 A1* | 11/2010 | Vesterinen | G06F 21/6245 |
| | | | 705/319 |
| 2011/0249002 A1* | 10/2011 | Duplessis | G06T 11/206 |
| | | | 345/440 |
| 2016/0019245 A1* | 1/2016 | Padmanaabhan | |
| | | | G06F 17/30306 |
| | | | 707/609 |

\* cited by examiner

SUMMARIZATION AND COMMUNICATION OF LARGE DATA SETS

TECHNICAL FIELD

This disclosure relates generally to techniques for presenting large data sets.

BACKGROUND

Various computing systems can be used to communicate data including, for example, client-server systems. Users on the client side may access data stored on the server side. This access may generate traffic. There may be a desire to understand how relevant the data is to the users. One approach is to analyze the data and the traffic. But because the size and structure of the data and of the traffic may be large and complex, determining and presenting this relevancy may not be simple.

Consider the example of web sites. Many web sites are large and complex in nature and provide multiple functionalities, such as allowing users to find information, engage in commerce, socialize, or other functionalities. Such web sites may have thousands or even more of unique web pages and may be visited every day by millions or even more of users.

An administrator of a web site may be interested in determining traffic patterns associated with visits of the users to the web site. This understanding may allow the administrator to improve the design of the web site by ascertaining, for example, which web pages are most relevant to the users, which web pages are visited together, which web pages are most frequented, or other traffic pattern information. Accordingly, a summary of the traffic patterns may be generated and provided to the administrator. However, the size and structure of the web site and of the associated traffic may raise challenges when generating a meaningful summary that can properly communicate the various traffic patterns to the administrator. For example, communicating such a summary may lead either to overwhelming the administrator with too much information or to under-representing the traffic patterns with too little information.

There have been various efforts in the industry and academic research to generate and provide summaries of traffic patterns. However, the provided summaries may be limited in the level of available interaction and granularity. For example, Adobe Discover® and Google Analytics® offer analytics tools for summarizing traffic patterns of a web site. Although high level information may be provided, such summaries may not be granular enough to a level of individual web pages. Also, to be generated, the summaries may require a tagging of the web pages so that tags can be used for representing the traffic patterns. This tagging may present multiple challenges. For example, the tagging may be manual and, thus, may limit the applicability of the tools. In a further example, a same tag may be used for multiple web pages and, thus, information about traffic patterns between these web pages may be lost in the summary.

SUMMARY

One exemplary embodiment involves generating a structure for a plurality of documents hosted on a network-based resource. The structure may comprise a plurality of nodes that may represent the plurality of documents. Additionally, the exemplary embodiment involves determining a traffic pattern between a first document, a second document, and a third document of the plurality of documents. This determination may be based on traffic information associated with the network-based resource. Further, the exemplary embodiment involves grouping, based on the traffic pattern, a first node representing the first document and a second node representing the second document in a first group and grouping, based on the traffic pattern, the first group and a third node representing the third document in a second group. In this exemplary embodiment, indications of the traffic pattern may be displayed in a user interface by, for instance, indicating on the user interface the grouping of the first node and second node in the first group and the grouping of the first group and third node in the second group.

These illustrative features are mentioned not to limit or define the disclosure, but to provide examples to aid understanding thereof. These and additional features may be implemented independently in various embodiments or may be combined in yet other embodiments, further details of which can be seen with reference to the following description and illustrations. Advantages offered by one or more of the various embodiments may be further understood by examining the specification or by practicing one or more of the various embodiments.

BRIEF DESCRIPTION OF THE FIGURES

Embodiments of techniques according to the present invention are described in detail below with reference to the following drawings.

DETAILED DESCRIPTION

Figure 1:
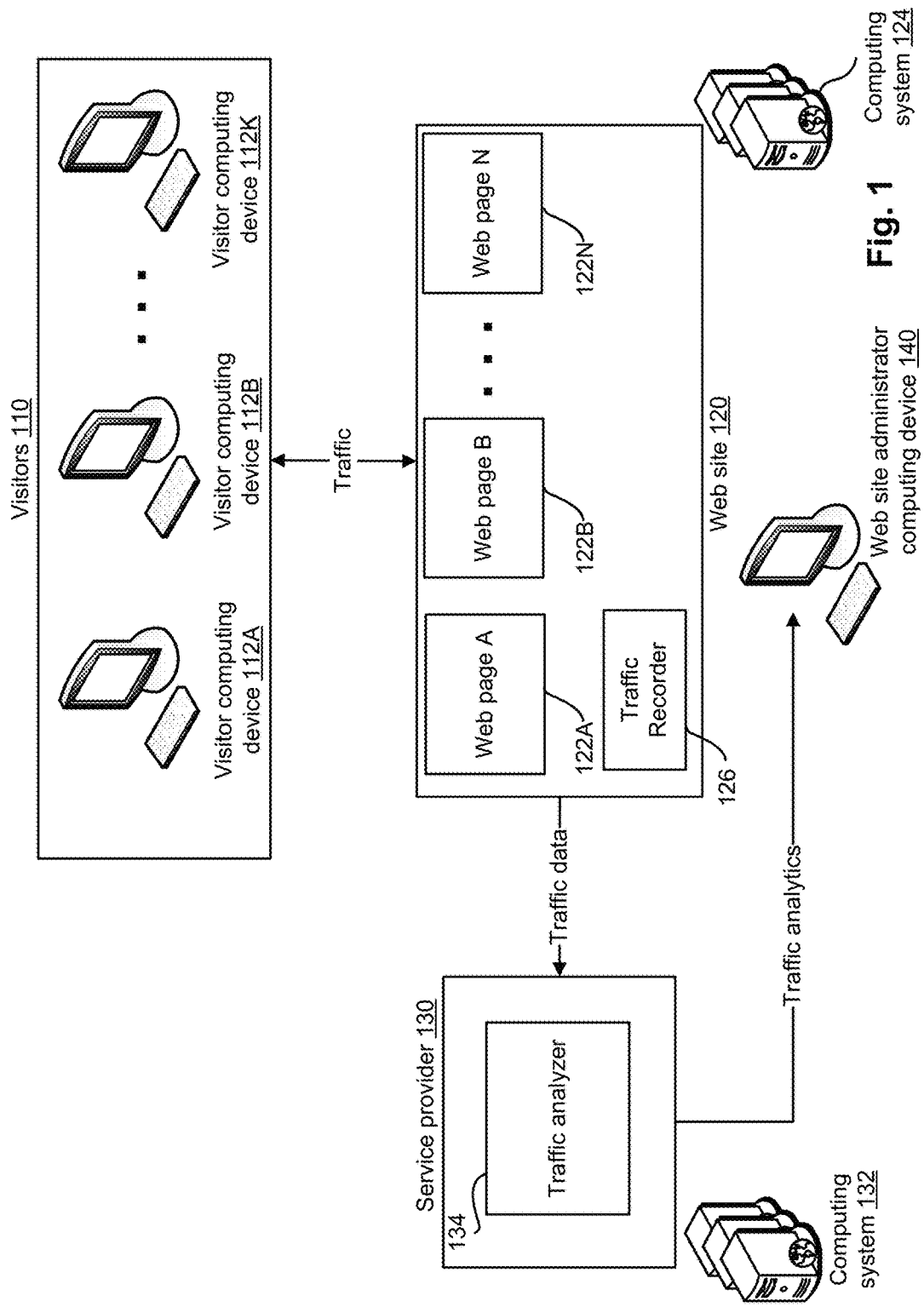
FIG. 1 illustrates an example computing environment for determining traffic patterns, according to certain embodiments of the present invention.

Specific details of various exemplary embodiments of the present invention are set forth in the following description and are illustrated in FIGS. 1-12. The various embodiments described herein can be implemented in hardware, software, or a combination thereof. In the figures, similar symbols may identify similar components, unless context dictates otherwise. Certain well-known technology details, such as methods, apparatuses, or systems that would be known by one of ordinary skill, are not set forth in the following description or in the figures to avoid unnecessarily obscuring the various examples. Those of ordinary skill in the relevant art will understand that they can practice other examples of the disclosed subject matter without departing from the scope and spirit of the present invention.

Generally, the embodiments described herein are directed to, among other things, analyzing and providing information about large data sets. Specifically, disclosed are methods, systems, and computer readable media that embody techniques for summarizing large data sets. An example of large data sets includes a network-based resource and traffic associated with the network-based resource in a client-server architecture. A server may host a network-based resource, such as a web site, that may include a number of documents, such as web pages. A client may include a computing device operated by a user to connect to the server to access some or all of the documents of the network-based resource. The embodied techniques may include executing a traffic analyzer configured to analyze and summarize information about the network-based resource based on the traffic.

The traffic analyzer may determine traffic patterns and may provide a summary that may include an interactive visual representation of the traffic patterns. The summary may allow a user to view the traffic patterns at various levels of granularity, from a top level representing an entire network-based resource to a low level representing individual documents of the network-based resource.

In the interest of clarity, the embodied techniques are described in the context of web sites and web pages. Nevertheless, the embodied techniques may be applied to any other network-based resources and documents, in client-server architectures and in other computing architectures. More particularly, the embodied techniques may be applied to analyze and summarize data sets that may be large in size, have complex structures, and may include various types of inter-data associations.

A web site may be a gigantic entity made of a collection of a large number of web pages, in the thousands or more, linked by universal record locators (URLs) and may be visited by a larger number of visitors, in the millions or more. A visitor may arrive at one of the web pages of the web site from an external web page, typing a query on a search engine or by entering a URL of the web page in a browser. Once on the web site, the visitor may traverse a unique path on the web site by clicking on URLs or using an internal search engine of the web site.

A web site administrator (e.g., an owner or a designer of the web site) may be interested in understanding how visitors interact with this gigantic entity made of a large number of inter-connected web pages. Understanding this interaction can help answer many questions, such as what are the most popular web pages on the web site, which web pages go together in the opinion of visitors, what are logical groupings of the web page, is it necessary to link diverse parts of the web site because visitors are traversing such parts in common paths, are there outliers among the web pages, and other questions. Answers to these questions may provide meaningful insights to the web site administrator on how to perform minor or major reorganizations of the web site to better serve the visitors. However, understanding this interaction may have many challenges. For example, given the large number of visitors and the large numbers of web pages and unique URLs of the web pages, the size of the data associated with the traffic between the visitors and the web site may be large. Thus, it may be challenging to analyze the traffic and to find and communicate the answers.

The embodied techniques may configure a traffic analyzer to analyze the traffic. Based on the analysis, the traffic analyzer may determine traffic patterns and generate a structure for representing the web site based on the traffic patterns. The traffic analyzer may be further configured to generate a summary that can visualize the structure. In the visualization, nodes from the structure may be represented individually and recursively clustered in labeled groups that may also be represented. As represented in the visualization, a size of a node may indicate a volume of traffic to a corresponding web page, a group may indicate traffic patterns between web pages, and a label of the group may describe the group. Additionally, the traffic analyzer may be configured to support various interactions of the web site administrator or other users with the visualization. For example, the web site administrator may be enabled to choose a level of granularity that may range between the highest level representing the entire web site and the lowest level representing individual web pages. These and other features are further described with reference to the figures below.

Turning to FIG. 1, that figure illustrates a computing environment for determining traffic patterns. More particularly, visitors 110 may visit a web site 120, which may result in traffic to, through, and/or out of the web site 120. A service provider 130 may receive traffic data indicative of the traffic and, in response, may analyze the traffic data to provide traffic analytics to a web site administrator. The traffic analytics may include summaries of traffic patterns that may be visually presented at a user interface of a computing device 140 of the web site administrator. In turn, the web site administrator may interact with the visualized summaries to understand the traffic patterns by, for example, varying levels of granularities for presenting the traffic patterns. In the interest of clarity of explanation, the web site administrator is illustrated in FIG. 1 as a user of the traffic analytics. However, other users may exist, such as web site designer, a user interface designer, a marketer, or more generally any analytics consumer.

The visitors 110 may include clients, users, or other entities that may operate computing devices 112A-112K to connect to and access the web site 120. Each visitor may be associated with one or more of the computing devices 112A-112K. As explained above, there may be a large number of visitors 110 that may connect to the web site 120. Each of the visitors 110 may generate traffic that may be unique to that visitor. For example, a visitor may initially connect to the web site 120 at an entry point (e.g., a first visited web page), may leave the web site 120 at an exit point (e.g., a last visited web page), and may traverse or navigate a path in the web site 120 between the entry point and the exit point (e.g., may visit a number of web pages in a session). An example of traffic is further described in FIG. 2.

Because of the large number of the visitors 110, there may also may be a large number of the computing devices 112A-112K. In an example, each of the computing devices 112A-112K may be any type of computing device configured to access the web site 120 over a number of networks, including portable computing devices and conventional computing devices. A portable computing device may allow mobility to the user during at least operation and may include, for example, a mobile phone, a smart phone, a personal digital assistant (PDA), a phablet, a tablet, and other portable computing devices. In comparison, a conventional computing device may be more stationary, may include larger processing power and memory space than the ones of a portable computing device, and may have an operating system that may be more sophisticated than the one of a portable computing device. A laptop, a personal computer, a desktop computer, and a server are examples of conventional computing devices.

The web site 120 may be a collection of web pages 122A-122N linked by URLs and may be hosted on a computing system 124. The computing system 124 may include a combination of a server, a portable computing device, a conventional computing device, virtual computing devices, or other computing devices. Further, the computing system 124 may cluster a number of computing devices. A content data network, a datacenter, and a server farm are examples of such a computing system 124.

As explained herein above, there may be a large number of web pages 122A-122N for presenting information and providing various functionalities to the visitors 110. Each of the web pages 122A-122N may be accessible to the computing devices 112A-112K of the visitors 110 when connected to the computing system 124 over a number of networks. The traffic of the visitors 110 to the web site 120 may include traffic to, through, and/or out of the web pages 122A-122N. This traffic can be analyzed to determine traffic patterns associated with, for example, how the visitors 110 navigate between the various web pages 122A-122N. Examples of traffic patterns are further described in FIG. 3.

The networks may be communication networks configured to connect the computing devices 112A-112K and the computing system 124 hosting the web site 120. In an example, the networks may include any one or a combination of many different types of networks, such as cable networks, the Internet, wireless networks, cellular networks, and other private and/or public networks.

In addition, the web site 120 may include a traffic recorder 126 configured to record the traffic to the web site 120. The traffic recorder 126 may include code modules that may execute scripts (e.g., Javascripts) for recording and providing traffic data representative of the traffic. In an example, the scripts may be provided by the service provider 130 and may be implemented by the web site administrator. The traffic data may include, for instance, clicks by the visitors 110 on URL links to the web pages 122A-122N and other data as further described in FIG. 2. Further, the traffic recorder 126 may be configured to automatically, periodically, or at time intervals cause the computing system 124 hosting the web site 120 to send the traffic data to a computing device 132 of the service provide 130.

The service provider 130 may implement a traffic analyzer 134 to analyze received traffic data and to generate traffic analytics based on the analysis. The traffic analyzer 134 may include code modules executable by the computing system 132. When executed, the code modules may configure the traffic analyzer 134 to perform various operations related to analyzing the traffic data and generating the traffic analytics. The operations may include, for example, determining traffic patterns from the received traffic data and generating a structure for representing the traffic patterns. An example structure is further described in FIG. 4. Also, the operations may include generating summaries of the traffic patterns based on the structure and providing an interface for presenting various visualizations of the summaries. An example of visualization is further described in FIG. 5. The interface may provide interactive visualizations that can be viewed at different levels of granularity.

The traffic analyzer 134 may cause the computing system 132 to host the interface such that the web site administrator may operate the computing device 140 to access the interface and view the visualizations. In another example, the traffic analyzer 134 may cause the computing system 132 to send the traffic analytics, including the visualizations, to the computing device 140 for display to the web site administrator without further interaction with the computing system 132.

Hence, by implementing a traffic analyzer 134, a service provider may provide traffic analytics to a web site administrator interested in understanding how visitors use the web site based on traffic of the visitors. The traffic analytics may be provided in interactive visual summaries that may allow the web site administrator to view traffic patterns at various levels of granularity. This may allow the web site administrator to modify a design of the web site, as needed, in order to improve the visitors' user experience.

Figure 2:
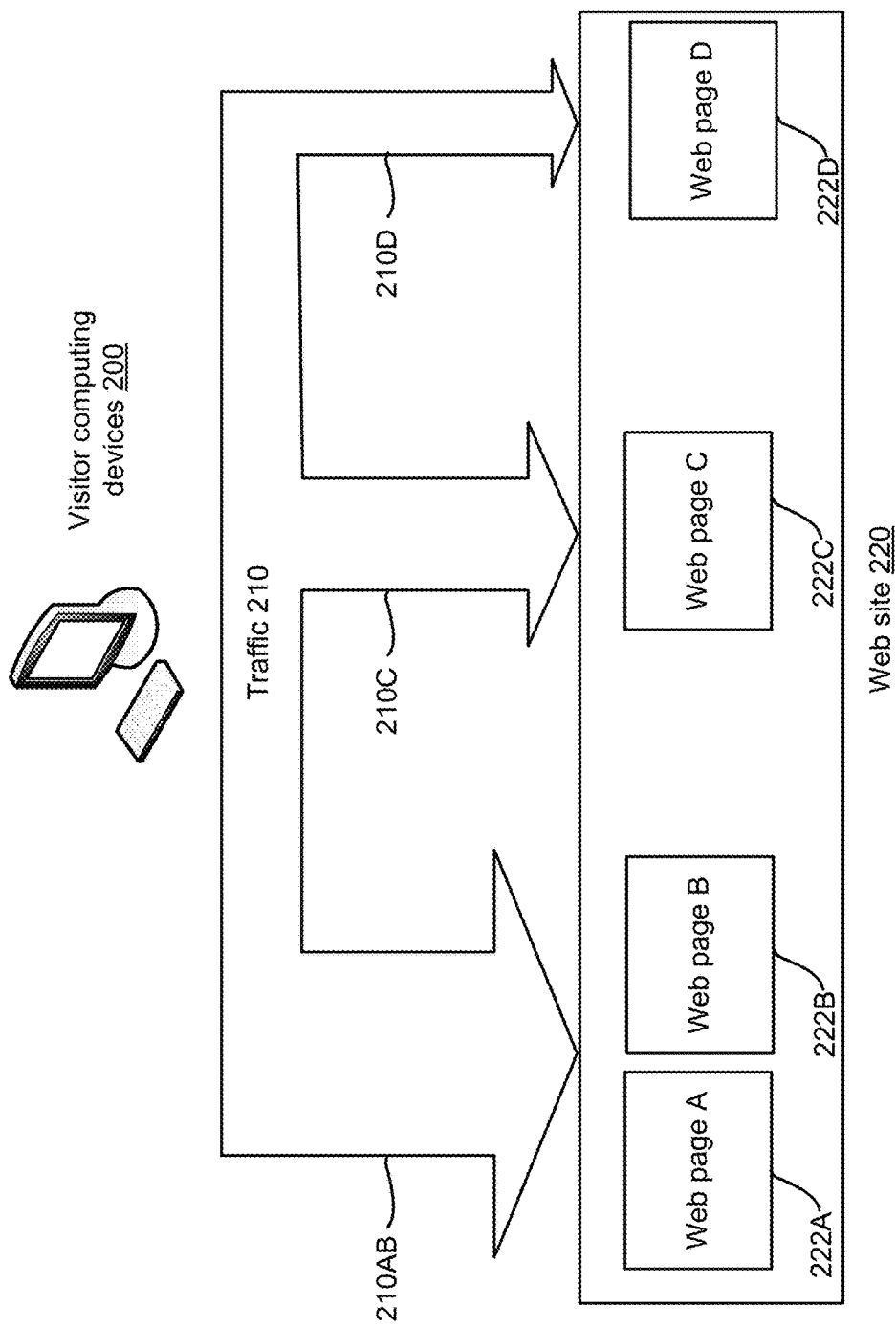
FIG. 2 illustrates example traffic to a computing resource, according to certain embodiments of the present invention.

Turning to FIG. 2, that figure illustrates an example of traffic 210 associated with a web site. The traffic 210 may be recorded and analyzed to determine traffic patterns. In the interest of clarity of explanation, FIG. 2 illustrates a web site 220 that includes four web pages 222A-222D. However, the web site 220 may include a larger number of web pages for which traffic may be recorded and analyzed. As illustrated, visitors may operate computing devices, shown collectively as computing devices 200 in FIG. 2, to access web pages of the web site 220.

Each of the visitors may access and navigate a number of the web pages 222A-222D. As such, the traffic 210 may vary between the visitors with regard to, for instance, the number of the web pages visited, which of the web pages are visited, and the order the web pages are visited. Said differently, various visitors may have different entry points to, different navigation paths through, and/or different exit points from the web site 220. For example, a visitor may first connect to the web page 222A, navigate to the web page 222B from the web page 222A, navigate to the web page 222C from the web page 222B, and exit the web site 220 from the web page 222C. In comparison, another visitor may first connect to the web page 222D, navigate to the web page 222A from the web page 222D, and exit the web site 220 from the web page 222A. These two examples are illustrative and other traffic for other visitors may exist.

For each visitor, the associated traffic may be recorded. For example, as a visitor requests a web page from the web site 220, the request may generate a signal that the web site 220 may record in a clickstream. As such, the clickstream may include a series of selections (e.g., a stream of clicks of the visitor for requesting web pages) made by the visitor at the website 220 and may represent the traffic of the visitor. Generally, clickstream data may be high in volume and velocity, with one day's worth of such data amounting to a large data size, in the tens or hundreds of gigabytes or more, for any major web site. Further, the clickstream data may be large in variety and may be inherently heterogeneous.

The traffic from the various visitors may be aggregated to generate the traffic 210. For example, the traffic 210 may include clickstreams of the various visitors to the web site 220. As such, the traffic 210 may include a volume of requests or accesses to web pages, entry points to the web site 220, exit points from the web site 220, navigation paths between the web pages 222A-222D, orders in which web pages 222A-222D are navigated, and other traffic-related information.

As illustrated in FIG. 2, the traffic 210 may include traffics 210AB, 210C, and 210D. The traffic 210AB may indicate that, for example, a large volume of the traffic 210 is directed to the web pages 222A and 222B and that the web pages 222A and 222B are typically traversed together (e.g., in a same session, visitors that access the web page 222A also typically access the web page 222B). In comparison, the traffic 210C may indicate that a lower volume of traffic is directed to the web page 222C and that, sometimes, the web page 222C is visited in conjunction with the web pages 222A and/or 222B. On the other hand, the traffic 210D may indicate that an even lower volume of traffic is directed to the web page 222D and that it is less occasional to visit the web page 222D in conjunction with the web pages 222A, 222B, and/or 222C.

To illustrate, the web site 220 may offer video gaming products for sale. In this example, the web page 222A may present various available gaming consoles, while the web page 222B may present various video games that may be purchased with the gaming consoles. On the other hand, the web page 222C may present various available gaming accessories, such as joysticks, and the web page 222D may provide help information, such as a page of frequently asked questions and answers.

Visitors to this web site 220 may be gamers looking to purchase gaming-related products. Most gamers may use the web site to purchase gaming consoles and video games together. The gamers may also use the web site to, on occasion, purchase gaming accessories, and to, less frequently, search for help. As such, the traffic may follow the illustrated traffic 210. More particularly, the traffic may indicate that a high traffic volume is directed to the web pages 222A and 222B that may be visited together, a lower traffic volume to the web page 222C that may be, on occasion, visited in conjunction with the web page 222A or 222B, and an even lower traffic volume to the web page 222D.

Figure 3:
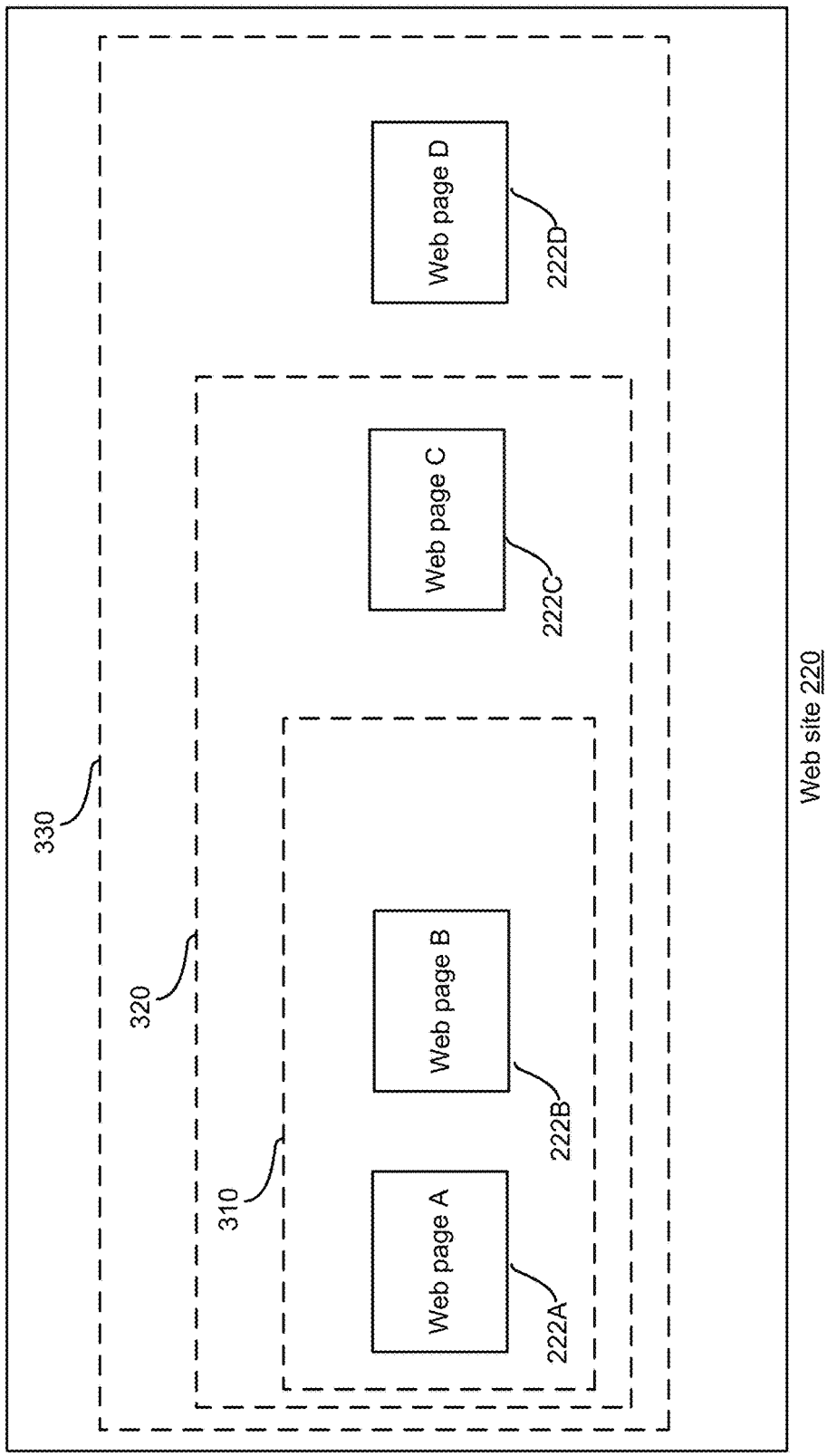
FIG. 3 illustrates example traffic patterns perceived at a computing resource, according to certain embodiments of the present invention.

Turning to FIG. 3, that figure illustrates example traffic patterns that may be detected at the web site 200. The traffic patterns may represent various types of associations between the web pages 222A-222D. For example, the traffic patterns may indicate a relative traffic volume of a web page, a relative frequency at which a web page is visited, orders in which web pages are navigated, frequencies for navigating web pages being together or in conjunction, likelihoods of navigating web pages together or in conjunction, and other associations between web pages.

The traffic 210 may be analyzed to determine multiple traffic patterns. FIG. 3 illustrates three example traffic patterns 310, 320, and 330. The traffic pattern 310 may indicate that the web pages 222A and 222B are not only more frequently visited than the other web pages, but that the web pages 222A and 222B are typically traversed together. In comparison, the traffic pattern 320 may indicate that the web page 222C is less frequently visited than the web page 222A or 222B. Also, the traffic pattern 320 may indicate that visitors more frequently navigate between the three web pages 222A-222C than between any of the three web pages 222A-222C and the web page 222D. Similarly, the traffic pattern 330 may indicate that the web page 222D is the least frequented page of all four pages 222A-222D.

To illustrate, and referring to the video gaming-related example, the traffic patterns may reveal various types of information about how gamers perceive and use the web site. For example, the traffic patterns may indicate that the gamers frequently visit the web pages 222A and 222B together to purchase gaming consoles and video games. After viewing or purchasing a gaming console or a video game, the gamers may occasionally visit the web page 222C to purchase gaming accessories, and may less frequently visit the web page 222D to search for help.

To help a user (e.g., a web site administrator of the web site 220 or any analytics consumer) understand the traffic patterns, summaries of the traffic patterns may be generated. To do so, a structure (e.g., a hierarchical structure such as a tree structure) may be generated to enable the user to look at the traffic patterns at multiple levels of granularity and to aid in communicating the identified patterns. An example structure is described in FIG. 4. However, when the structure becomes large, visualization of such a structure may become challenging. A visualization that clusters information at different levels of the structure may overcome the challenges. Based on content of each cluster, a label for each cluster may be generated and presented in the visualization to identify or represent the clusters in a meaningful way. An example of visualization and labels is described in FIG. 5.

Figure 4:
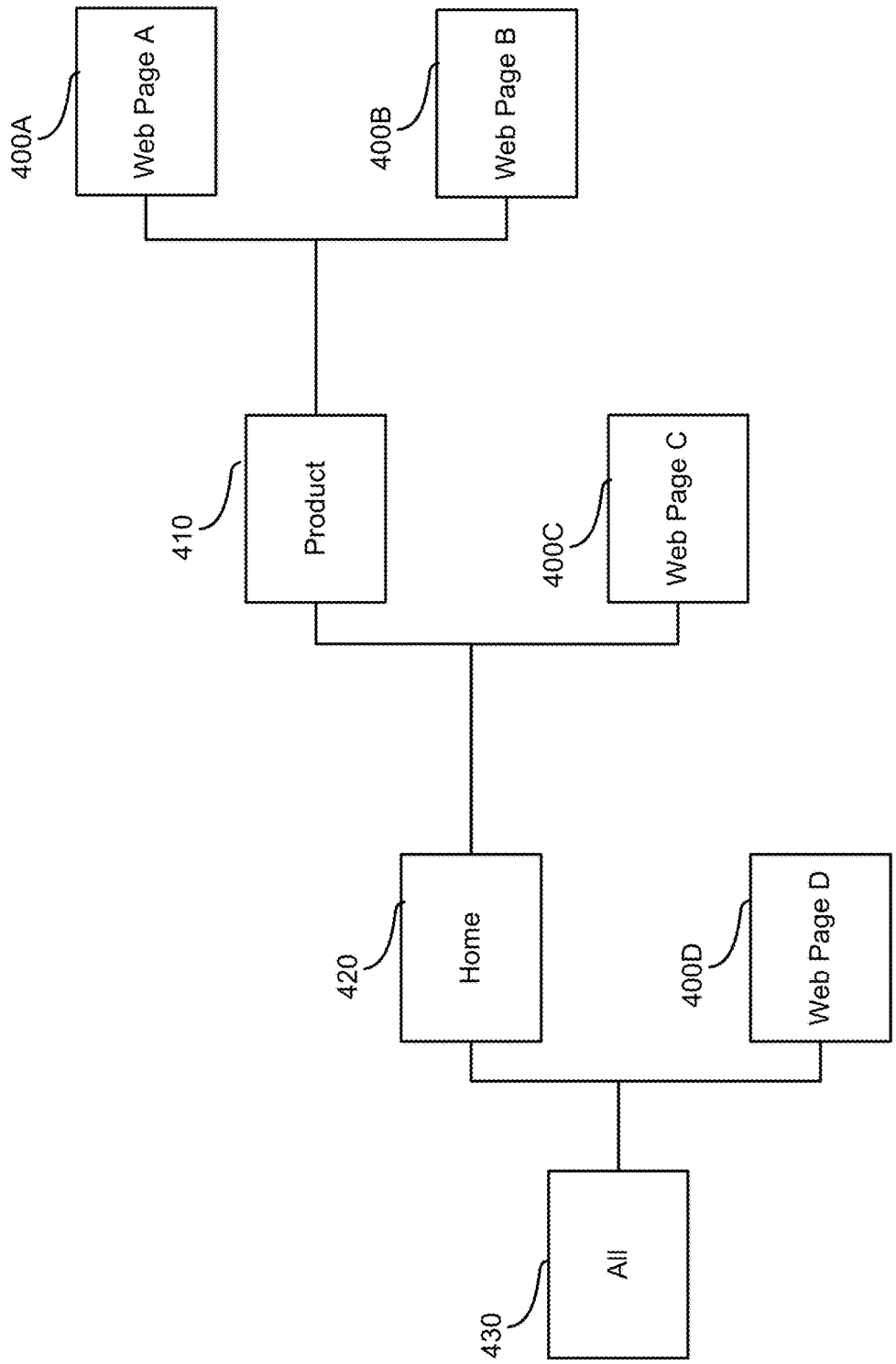
FIG. 4 illustrates an example structure for representing traffic, according to certain embodiments of the present invention.

Turning to FIG. 4, that figure illustrates an example structure for representing traffic patterns. The structure may be a hierarchical structure that may correlate information at various hierarchies of the structure. A tree structure is an example of a hierarchical structure that may be used. Generally, a tree structure may be a way of representing the hierarchical nature of a structure in a graphical form. Elements of the tree structure may be called nodes and lines connecting elements may be called branches. A root node may sit at the highest hierarchy level of the tree structure. A node's parent may be a node that is one level higher in the hierarchy and lying on the same branch. A node's child may be a node that is one level lower in the hierarchy and lying on the same branch. A node's sibling may be a node that is on a same level in the hierarchy and that shares a same parent node. A terminal node may be a node that does not have any child nodes.

The structure may depend on the traffic patterns. For example, web pages may be represented as terminal nodes. A terminal node representing a web page can be a child node or a sibling node of other nodes that may represent other web pages or groups of web pages. The correlation between the terminal node and the other nodes may be based on a type of association (e.g., a traffic pattern) between the corresponding web pages. In comparison, terminal nodes may not represent groups of web pages. Instead, a group of web pages may be represented with parent nodes, child nodes, or sibling nodes of other nodes representing other web pages or groups of web pages. The correlation between a node representing a group of web pages and other nodes may also be based on a type of association (e.g., traffic patterns) between the corresponding web pages. As explained herein above, the traffic patterns may indicate various types of associations. These types of associations can be used to organize nodes in the structure in a way that may reflect the traffic patterns.

To illustrate, two web pages that are visited together may be represented as terminal nodes that are child nodes of a same parent node. As such, the representation of these two web pages may indicate that the two child nodes are sibling nodes. In comparison, a third web page that is sometimes visited in conjunction with one or both of the web pages may be represented as a terminal node that is a sibling node of the same parent node but not as a sibling of the two child nodes.

Further, branches of the nodes may indicate information, such as metrics, about the traffic associated with the web pages or groups of web pages represented by the nodes. For example, a volume of traffic, a relative volume of traffic, a frequency of access, a relative frequency of access, a likelihood of access, and other metrics may be associated with the branches.

As illustrated in FIG. 4, the web pages 222A and 222B may be represented in terminal nodes 400A and 400B, respectively. Because, the traffic pattern 310 may indicate that these two web pages are visited more frequently together than other web pages, the nodes 400A and 400B may be sibling nodes. A parent node 410 may be a parent of these two nodes. Similarly, because the traffic pattern 320 may indicate that the web page 222C is more frequently visited in conjunction with the web page 222A or 222B than with other web pages, the web page 222C may be represented with a terminal node 400C that may be a sibling node of the parent node 410. The terminal node 400C and the parent node 410 may be child nodes of a parent node 420. Also, because the traffic pattern 330 may indicate that the web page 222D is the least frequented web page, a terminal node 400D may represent the web page 222D and may be a sibling node of the parent node 420. The terminal node 400D and the parent node 420 may be children of a root node 430 that may represent the entire web site 220. In addition, each of the branches connecting a child node to a parent node or a parent node to another parent node or to the root node may indicate, for example, a volume of traffic or a relative frequency for accessing that node. An example flow for generating the structure is described in FIG. 6.

Further, each of the nodes in the tree structure may be labeled based on what web page or group of web pages that node represents. For example, the node 400A may be labeled with information about the web page 222A, such as a title of the web page 222A (e.g., web page A as shown in FIG. 4), a URL of the web page 222A, or a tag from the URL. In comparison, the parent node 410 may represent the web pages 222A and 222B. As such, the parent node 410 may be labeled with information about the web pages 222A and 222B. For example, the parent node 410 may combine the title of the web pages 222A and 222B (e.g., web pages A and B), combine a URL of the web pages 222A and 222B, or combine tags from the URLs. As shown in FIG. 4, the parent node 410 is labeled "product" because, for example, the URLs of the web pages 222A and 222B may use a common tag of "product."

As shown in FIG. 4, with only a few number of web pages and associations or traffic patterns between the web pages, the structure can quickly grow in size and complexity. For example, with the four web pages 222A-222D and the three traffic patterns 210AB-210D, the tree includes seven nodes. As such, with a larger number of web pages and more involved traffic patterns, the structure can become more complex. Presenting such a complex structure on a user interface may not be feasible or, even if feasible, may not be user friendly and intuitive to use. In other words, a visualization of the structure that summarizes the information contained in the structure may offer a better approach for presenting the traffic patterns to a user.

Figure 5:
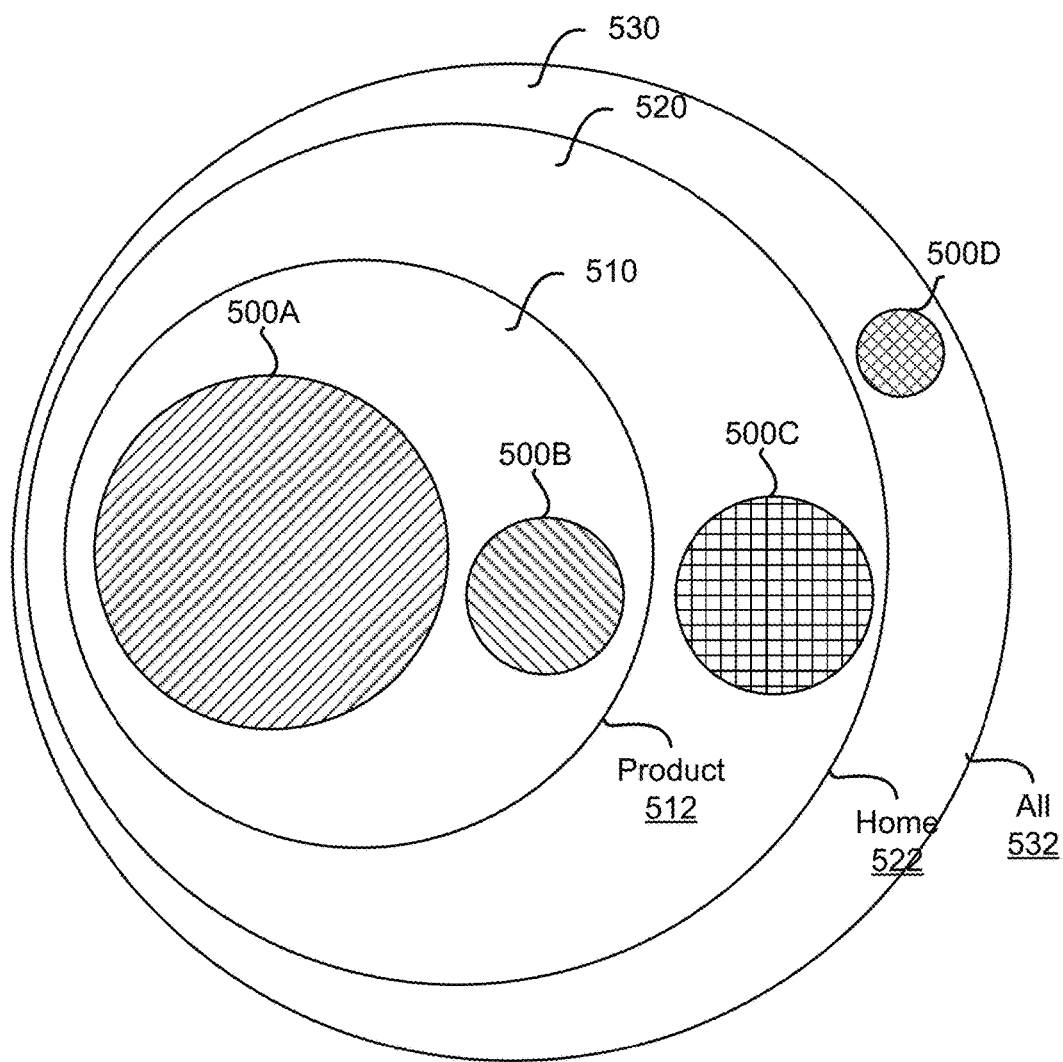
FIG. 5 illustrates an example summary of traffic patterns, according to certain embodiments of the present invention.

Turning to FIG. 5, that figure illustrates an example visualization of the structure of FIG. 4. The visualization may use a plot, such as a bubble plot, that may incorporate all the information of the structure at any desired level of granularity in an interactive presentation. In this visualization, the information may be laid out as a collection of recursive groups. More particularly, each node from the structure may be represented by a geometric shape, and the geometric shapes may be clustered together in recursive groups based on the various types of associations or traffic patterns between the web pages that the nodes may represent. Further, traffic information to the web pages (e.g., a volume of traffic or a frequency of access), which may be associated with the branches of the structure, may be used to further define the geometric shapes, such as to set the sizes of the geometric shapes. Additionally, labels of the nodes may be used to label the groups. These and other features of the visualization are further described herein next.

A node corresponding to a web page may be represented using a circle, which may be referred to herein as a node circle. A group of nodes may be also represented using a circle, which may be referred to herein as a group circle. A group circle may correspond to a parent node from the structure of FIG. 4. To visually distinguish between node circles and group circles, different colors may be applied. For example, node circles may be shaded while group circles may be transparent.

As used herein, a circle may correspond to a node circle or to a group circle. The shape, size, or color of a circle may be set to visually and easily convey information about traffic to web page(s) corresponding to the circle. In comparison, the clustering of circles may be set to also visually and easily convey information about traffic patterns between web pages corresponding to the circles. An example flow for clustering the circles is described in FIG. 6.

A size of a circle may be set based on traffic associated with the web page(s) represented by that circle. For example, the size may be proportional to a volume or frequency of the traffic. As such, the larger the volume or frequency is, the larger the size of the circle may be. Additionally or alternatively, the color of the circle may be based on the volume or frequency. For example, the higher the volume or frequency is, the darker the color may become. Or, circles with high traffic may be colored with red, circles with low traffic may be colored with green, and with yellow otherwise. Thus, when the circles are displayed to a user, the user can easily ascertain the various volumes or frequencies of traffic to web pages represented in the circles.

Although circles are used in the example visualization of FIG. 5, other geometric shapes may be used. The geometric shapes may be different and may vary. For example, squares may be used to represent nodes corresponding to web pages, while rectangles may be used to represent groups of nodes. Similarly, a shape of a node or a group of nodes may be based on the corresponding web page(s). For example, a node corresponding to a web page for selling gaming consoles may be represented using a generic gaming console icon. Similarly, a home icon may be used for a group that represents a home page corresponding to multiple web pages. Also, a shape of a node or a group of nodes may be based on the traffic to the corresponding web page(s). For example, a node with a high volume of traffic may be represented with a star shape while a node with a lower volume of traffic may be represented with a circle.

To recursively cluster the circles, various rules may be applied. These rules may reflect the different types of associations between the nodes as derived from the traffic patterns. Which rules should be applied may depend on the algorithm(s) used to derive the traffic patterns. For example, if the used algorithm assesses traffic patterns based on traffic frequencies, rules that use frequencies may be applied.

As explained above, a node circle may represent an individual web page. In comparison, a group circle may include a group of nodes and may, thus, represent a group of web pages. Two node circles may be clustered in a same group circle using any or a combination of the following rules: (1) when the two corresponding web pages are typically traversed together, (2) when traffic between the two web pages has a higher volume than traffic between any of the two web pages and another web page, (3) when the volume of traffic between the two web pages exceeds a predefined threshold, (4) when a frequency of navigating between the two web pages exceeds a threshold, (5) when the frequency of navigating between the two web pages is higher than a frequency of navigating between any of the two web pages and another web page, or (6) when it is more likely to navigate between the two web pages than between any of the two web pages and another web page.

A node circle and a first group circle may be clustered together in a same second group circle using similar rules as the ones above. For example, this clustering may occur when (1) traffic between the web page corresponding to the node circle and the web pages corresponding to the first group circle has a volume that exceeds a predefined threshold, (2) the volume is higher than the one for traffic between any of these web pages and another web page, (3) a frequency of navigating between the web page corresponding to the node circle and the web pages corresponding to the first group circle exceeds a threshold, (4) the frequency is higher than a frequency for navigating between any of these web pages and another web page, or (5) it is more likely to navigate between the web page corresponding to the node circle and the web pages corresponding to the first group circle than between any of these web pages and another web page.

Similarly, two group circles may be clustered together in same third group circle using similar rules as the ones above. For example, this grouping may occur when (1) traffic between the web pages corresponding to the nodes in the first group circle and the web pages corresponding to the nodes in the second group circle has a volume that exceeds a predefined threshold, (2) the volume is higher than the one for traffic between any of these web pages and another web page, (3) a frequency of navigating between the web pages corresponding to the nodes in the first group circle and the web pages corresponding to the nodes in the second group circle exceeds a threshold, (4) the frequency is higher than a frequency for navigating between any of these web pages and another web page, or (5) it is more likely to navigate between the web pages corresponding to the nodes in the first group circle and the web pages corresponding to the nodes in the second group circle than between any of these web pages and another web page.

In addition to recursively clustering the circles, labels may be generated and associated with each circle. The label of a circle may depend on the node(s) in the circle. In an example, the labels may be similar or may be based on the labels of the structure of FIG. 4. In another example, the labels may reflect information about the nodes and information about the corresponding traffic.

A label of a node circle may include any or a combination of two types of information: information about the web page that the node circle represents and information about the traffic to the web page. For the first type of information, any or a combination of a title of the web page, a URL of the web page, or a tag from the URL may be used. The title of the web page may be derived from the content of the web page. For example, HTML code of the web page may be parsed and content from a title header may be used as the title of the web page. For the second type of information, a volume of traffic, a frequency of access, and other traffic-related information may be used. Further, the two types of information may be combined to form the label. For example, the traffic information may be appended to the end of the web page information (e.g., the label may include the URL, a space, and an amount of the volume of traffic). In another example, the label may include two lines, where the web page information (e.g., the title) may be displayed in the first line, and where the traffic information (e.g., the frequency of access) may be displayed in the second line. An example flow for labeling the circles is described in FIG. 6.

In addition to using labels, each of the node circles may be linked to the corresponding web pages. In this way, when a user clicks on a node circle displayed in a user interface, the web page represented by the node circle may be displayed in the user interface.

A label of a group circle may include similar information as a label of a node circle. More particularly, the label of the group circle may also include two types of information: information about web pages that the group circle represents and information about traffic to the web pages. Because the group circle combines a plurality of node circles representing a plurality of web pages, the corresponding label may reflect information about some or all of the plurality of web pages. For example, this label may combine labels (e.g., titles) of a number of the plurality of node circles, such as the node circles that have the highest traffic volumes or are most frequently accessed. In another example, URLs corresponding to the plurality of web pages may be parsed to determine tags, and a frequency of use of each tag across the URLs may be determined. A tag from these tags is added to the label if the corresponding frequency of use exceeds a predefined threshold. Or, the most frequently used tags (e.g., the top three tags) may be combined to form the title. Additionally, the total volume of traffic corresponding to the plurality of node circles in the group circle may be added to the label (e.g., appended to the end of the label, added to a second line, or any other addition to the label).

As illustrated in FIG. 5, node circles 500A and 500B may correspond the terminal nodes 400A and 400B and, thus, may represent the web pages 222A and 222B. If the traffic associated with the web page 222A has a higher volume than the traffic associated with the web page 222B, the node circle 500A may have a larger size than the node circle 500B. This can be the case, when, for example, the sizes of the node circles 500A and 500B are set to be proportional to the volumes of traffic. Further, because the web pages 500A and 500B are typically navigated together, the node circle 500A and 500B may be clustered in a group circle 510 to reflect this traffic pattern or association between the two web pages. The group circle 510 may correspond to the parent node 410. Also, the group circle 510 may have a label 512 that depends on the web pages 500A and 500B. For example, if the URLs of the two web pages include a common tag labeled "product," that tag may be used as the label 512. Although not shown in FIG. 5, label 512 may also include a metric that indicates volume of traffic to the web pages 500A and 500B.

Similarly, a node circle 500C may correspond to the terminal node 400C and, thus, may represent the web page 222C. Because the web page 222C is not typically navigated together with the web page 222A or 222B, the node circle 500C is not includes in the group circle 510. If a volume of traffic associated with the web page 222C is higher than the one associated with the web page 222B but smaller than the one associated with the web page 222A, the size of the node circle 500C may be larger than the size of the node circle 500B but smaller than the size of the node circle 500A.

However, because traffic is more often (or a higher volume of traffic is) directed from the web page 222A or 222B to the web page 222C than to the web page 222D, a group circle 520 may group the node circle 500C and the group circle 510. The group circle 520 may correspond to the parent node 420. The group circle 520 may be also labeled with a label 522 that may depend on the web pages 222A, 222B, and 222C that are represented in the group circle 520 and on the traffic to these web pages. For example, if the URLs of the web pages 222A, 222B, and 222C commonly contain a tag labeled "home," that tag may be added to the label 522. Similarly, a metric that indicates the volume of traffic to the web pages 222A, 222B, and 222C may be added to the label 522.

Additionally, a node circle 500D may correspond to the terminal node 400D and, thus, may represent the web page 222D. Because the web page 222D is not typically navigated together with the web page 222A 222B, or 222C, the node circle 500D is not includes in the group circle 510 or the group circle 520. If a volume of traffic to the web page 222D is the smallest of traffic volumes, the size of the node circle 500D may be the smallest. Further, because traffic is less frequently (or a small volume of traffic is) directed from the web page 222A, 222B, or 222C to the web page 222D, a group circle 530 may group the node circle 500D and the group circle 520. The group circle 530 may correspond to the parent node 430. The group circle 530 may be also labeled with a label 532 that may depend on the web pages 222A, 222B, 222C, and 222D that are represented in the group circle 530 and on the traffic to these web pages. For example, because the group circle 530 represents all of the web pages that the web site 220 contains, the label 532 may include the title "all" to reflect the content of the group circle 530. Similarly, a metric that indicates the total volume of traffic to the web site 220 may be added to the label 532.

Hence, a user viewing the visualization of FIG. 5 can quickly ascertain the traffic to each web page and the traffic patterns between the web pages. More particularly, based on the size of each node circle, the user can perceive the corresponding traffic volume. Also, based on the clustering of the node circles in group circles, the user can perceive how the various represented web pages are navigated. The labels may also provide a short description of what a group circle may contain.

Figure 6:
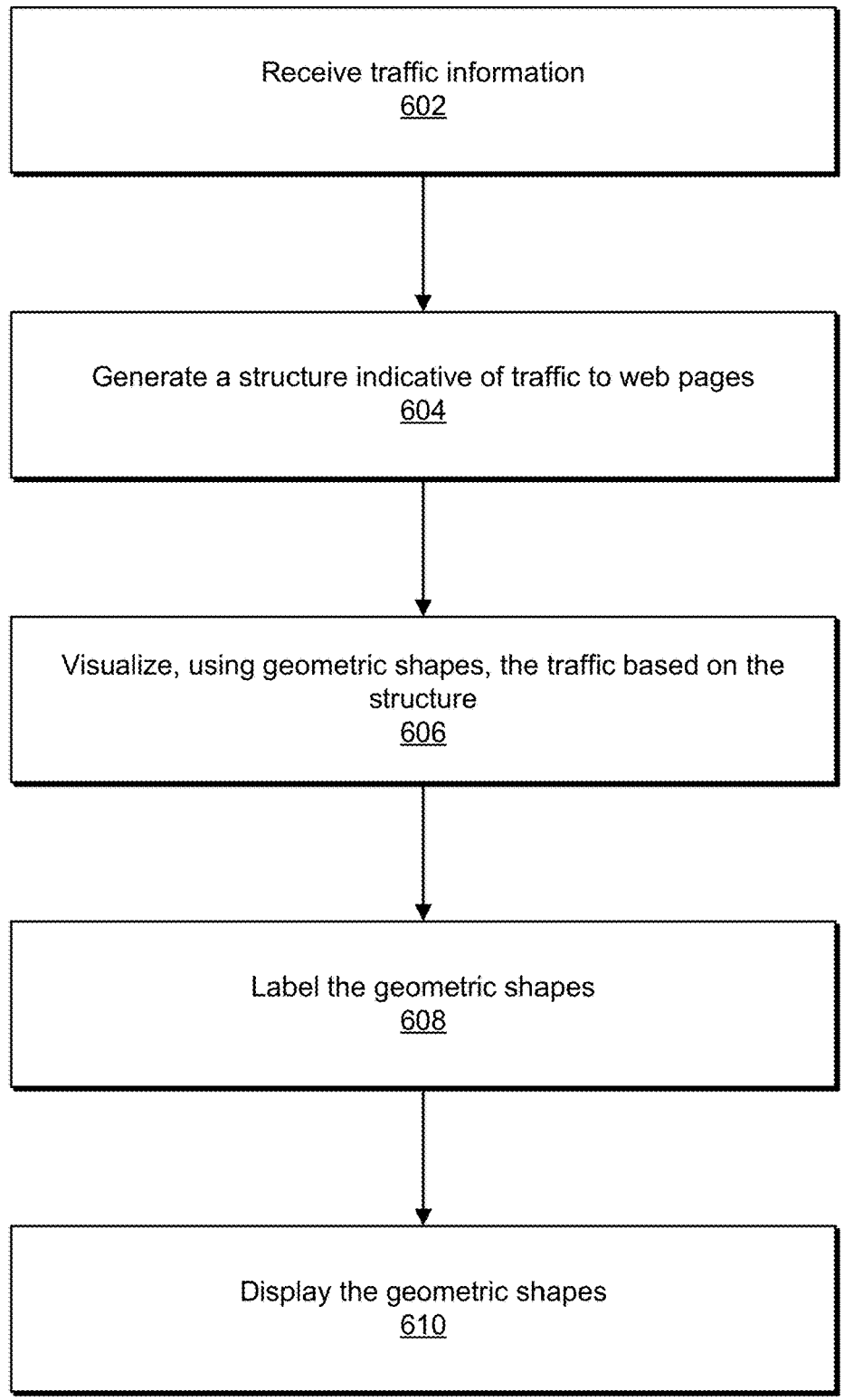
FIG. 6 illustrates an example flow for providing a summary of traffic patterns, according to certain embodiment of the present invention.
Figure 7:
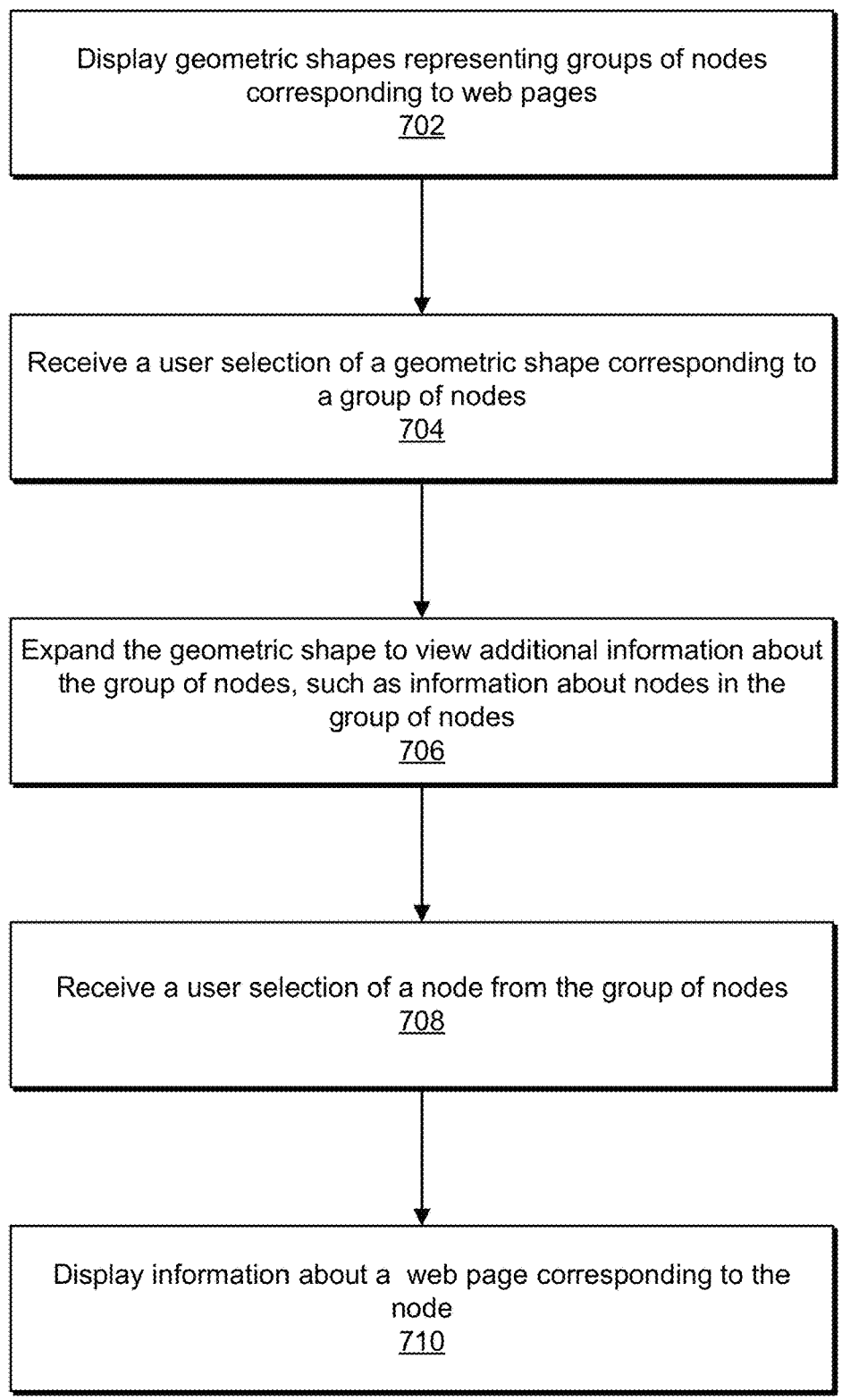
FIG. 7 illustrates an example flow for interacting with a summary of traffic patterns, according to certain embodiment of the present invention.

Turning to FIGS. 6 and 7, those figures illustrate example flows for visualizing traffic to and for interacting with the visualization. In the illustrative operations, each of the operations or functions may be embodied in, and fully or partially automated by, code modules executed by one or more processors of a computing system hosting a traffic analyzer (e.g., the computing system 132 hosting the traffic analyzer 134). Also, while the operations are illustrated in a particular order, it should be understood that no particular order is necessary and that one or more operations may be omitted, skipped, and/or reordered. Further, in the interest of clarity of explanation, a traffic analyzer is described as performing the illustrative operations. Nevertheless, other or additional code modules of a computing system may be configured to implement one or more of the operations and/or one or more steps of the operations.

Turning to FIG. 6, that figure illustrates an example flow for generating a structure and for visualizing the structure. More particularly, traffic information, such as the traffic 210, may be an input to the flow. A structure and a visualization of the structure for representing the traffic, traffic patterns, and associations between web pages may be outputs of the flow.

The flow of FIG. 6 starts at operation 602, where the traffic analyzer may receive traffic information. The traffic information may include traffic data recorded at a web site and associated with navigation in and out of the web site and between web pages of the web site. Clickstreams of visitors to the web site are examples of traffic data.

At operation 604, the traffic analyzer may generate a structure representing the web site and indicative of traffic associated with the web pages. An example structure is a tree structure that may represent the web pages using terminal nodes (e.g., nodes that do not have child nodes) and groups of web pages using other types of nodes (e.g., parent nodes). Further, the tree structure may represent traffic patterns between the web pages and/or the groups of web pages using connections between the respective nodes. The traffic analyzer may generate the structure by applying various tree-based algorithms to the received traffic, such as hierarchical clustering algorithms (e.g., agglomerative algorithms, divisive algorithms, and other algorithms). An example hierarchical clustering algorithm includes an algorithm described in BLONDEL, V. D., GUILLAUME, J.-L., LAMBIOTTE. R., and LEFEBVRE, E., Fast Unfolding of Communities in Large Networks, Journal of Statistical Mechanics: Theory and Experiment, 2008(10):P10008, which may be referred to herein as the Blondel algorithm. The Blondel algorithm may detect communities in networks of web pages (e.g., web pages belonging to a same web site and linked with URLs) based on modularity measures.

For example, consider a set of web pages $\{A_1, A_2, \ldots, A_k\}$ that visitors tend to visit in one session, whereas other web pages not belonging to the set tend to not be visited during the same session. This set of web pages can include, for instance, the web pages 222A and 222B of FIG. 2. Communities in the network of the web pages may be detected, where two web pages (e.g., the web pages 222A and 222B) belong to one community if the likelihood of traveling between the two web pages is higher than that of traveling outside the community. The Blondel algorithm may represent the web pages and the communities using nodes and may partition the nodes into clusters, ensuring greater modularity within cluster traffic than between cluster traffic. The clustered nodes can be further clustered leading to a higher level of clusters. The Blondel algorithm can be used recursively, leading to a hierarchy with many levels, where the terminal nodes may represent the web pages. Even when there are a large number of nodes, in the millions or more, the Blondel algorithm can quickly detect communities. Further, the Blondel algorithm may connect the clusters and the nodes with connections (e.g., branches), where the connections are weighted based on the traffic volumes to the respective clusters and nodes.

At operation 606, the traffic analyzer may visualize, using geometric shapes, the traffic to the web pages based on the generated structure. An example of the visualization includes a bubble plot that uses circles. The bubble plot may be a single interactive representation that incorporates all available information from the structure at any desired level of granularity. The information may be laid out as a collection of recursive circles. The traffic analyzer may generate the circles and recursively cluster the nodes in the circle. For example, each terminal node or webpage may be represented by a grayed circle, the size of which may represent traffic to the web page. Web pages that fall within a circle may represent web pages which tend to be traversed together. Two circles, which fall within another circle, may represent two groups of web pages that tend to have more travel between the two groups, than outside of the two groups. A size of a circle may be proportional to the volume of traffic associated with the corresponding web page(s).

At operation 608, the traffic analyzer may label the geometric shapes based on the web pages that are represented by the geometric shapes and/or the traffic to the web pages. The labels may allow a user to understand what each geometric shape represents. For example, because a grayed circle may represent a terminal node that denotes a web page, the traffic analyzer may label the grayed circle with a URL of the web page. Additionally, the traffic analyzer may add to the label an indication of the traffic volume associated with the web page.

Further, the traffic analyzer may label the remaining circles that represent groups of multiple web pages. For example, for a circle that contains a plurality of web pages, the traffic analyzer may parse URLs of the web pages to find tags. The traffic analyzer may associate the respective tags found for a web page with that web page. Instead of labeling the circle with all of the found tags, the traffic analyzer may generate a label that combines the most prominent tags, such as tags that are most frequently found across the plurality of web pages, that are found with frequencies that exceed a predefined threshold, or that are associated with web pages that have a certain volume of traffic (e.g., the highest volume). Further, the number of tags may be limited to a predetermined number, such as three or some other number, so that the label does not become hard to read and understand. Additionally, the traffic analyzer may add to the label an indication of the traffic volume associated with the web pages represented in the circle.

At operation 610, the traffic analyzer may cause an interface to display the geometric shapes. For example, in response to a request from a user to view traffic analytics, the traffic analyzer may generate an interface where the bubble plot may be presented. As presented, the bubble plot may include the various circles, sized based on the traffic, clustered based on the traffic patterns, and labeled based on what web pages each cluster may represent. Various types of interaction may be available to the user, as further described in FIGS. 7-8, including for example, the ability to zoom in or out on any circle in the bubble plot to view traffic information at various levels of granularity.

Turning to FIG. 7, that figure illustrates an example flow for displaying a visualization of traffic through web pages to a user and for enabling various interactions with the user. For example, in response to a user request for traffic analytics received at an interface, a traffic analyzer may generate and a present a bubble plot at the interface as described herein above. In turn, the user can interact with the bubble plot to view traffic information at different levels of granularity.

The flow of FIG. 7 starts at operation 702, where a traffic analyzer may cause an interface to display geometric shapes representing groups of nodes corresponding to web pages. For example, in response to receiving traffic data associated with a web site that contains the web pages, the traffic analyzer may generate a bubble plot as described herein above. Further, in response to a request to view traffic analytics associated with the website received from a computing device of a user, the traffic analyzer may display the bubble plot at the interface. The bubble plot may include various geometric shapes, such as circles, each of which may represent a node or a group of nodes, where each node may correspond to a web page of the web site. An example bubble plot presented at an interface is further described in FIG. 8.

At operation 704, the traffic analyzer may determine that a user selection of a geometric shape is received at the interface. For example, the user may operate the computing device to select a geometric shape in the bubble plot by, for example, using a cursor to click on the geometric shape. The geometric shape may be a circle that represents a group of nodes. In response to this selection, the traffic analyzer may determine that the user has selected and is requesting additional information about the group of nodes.

At operation 706, the traffic analyzer may cause the interface to display an expanded view of the geometric shape to present additional information about the group of nodes. For example, the traffic analyzer may allow a zoom in view of the selected group of nodes, such that the various geometric shapes representing the nodes in the group may be brought into focus and presented with an expanded view. Additional information that may not have been presented, such as various labels, may be shown in this expanded view. An example expanded view presented at the interface is further described in FIG. 8.

The operations 704 and 706 may be repeated such that, in response to the user further selecting geometric shapes, the traffic analyzer may cause the interface to display expanded views corresponding to the selections. For example, the traffic analyzer may allow the user to zoom in to view various circles in the bubble plot at lower levels of granularity. Conversely, the traffic analyzer may allow the user to zoom out to view various circles in the bubble plot at higher levels of granularity.

At operation 708, the traffic analyzer may determine that a user selection of a geometric shape from the expanded view is received at the interface. For example, the user may operate the computing device to select a geometric shape corresponding to a node from the expanded view by, for example, using a cursor to hover over the geometric shape. The geometric shape may be a circle that represents the node. In response to this selection, the traffic analyzer may determine that the user has selected and is requesting additional information about the node.

At operation 710, the traffic analyzer may cause the interface to display information about a web page corresponding to the selected node. For example, the traffic analyzer may display at the interface a URL and an indication of the traffic volume associated with the web page. An example of presenting additional information about a selected node is further described in FIG. 8.

Additionally, at this operation, the traffic analyzer may allow the user to further select the node by, for example, using a cursor to click on the corresponding circle. In response to this additional selection, the traffic analyzer may cause the web page to be displayed at the interface.

Hence, the traffic analyzer may allow the user to interact with the bubble plot. The user may be able to view the traffic associated with the web pages and the traffic patterns between the web pages at various levels of granularity, including from the highest level that presents the traffic information of the entire web site down to the lowest level that presents the traffic information at an individual web page basis.

Figure 8:
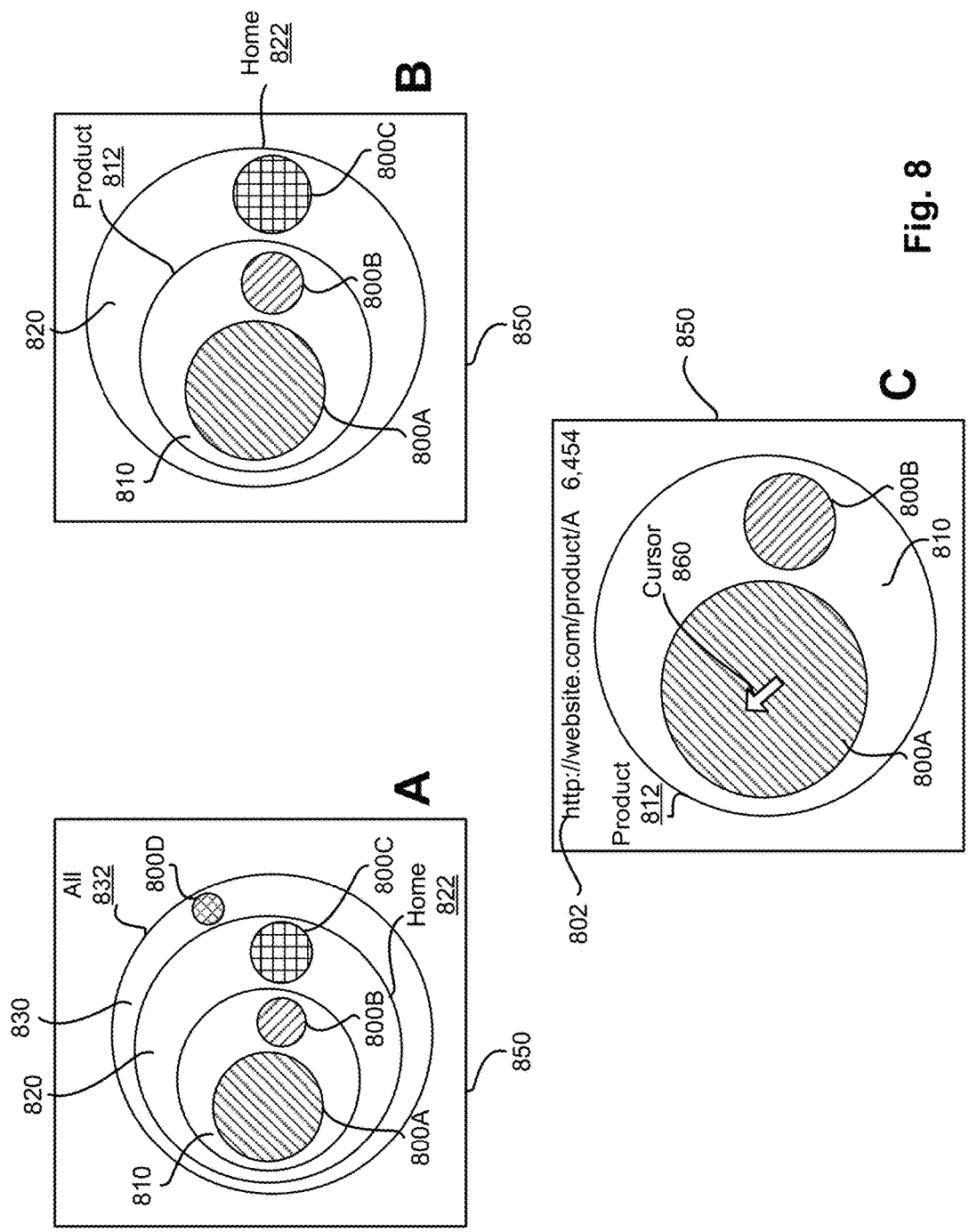
FIG. 8 illustrates an example summary of traffic patterns based on an interaction, according to certain embodiment of the present invention.

Turning to FIG. 8, that figure illustrates an example interface 850 for presenting a visualization of traffic information associated with a web site, such as a bubble plot, at various levels of granularity. The example bubble plot may correspond to the bubble of plot of FIG. 5 that may represent traffic information of the web site 220 of FIG. 2. The interface 850 may be presented at a computing device operated by a user and may allow the user to interact with the bubble plot as described in the flow of FIG. 7.

FIG. 8 shows three views of the bubble plot, each corresponding to a different level of granularity. As illustrated in view A of FIG. 8, the interface 850 may present the traffic information of the entire web site. This may allow the user to perceive the entire hierarchy of the web site viewed using traffic-based associations between web pages of the web site. For example, and referring to the web site 220, grayed circles 800A, 800B, 800C, and 800D may represent the web pages 222A, 222B, 222C, and 222D, respectively. The grayed circles may be sized based on the corresponding traffic and may be recursively clustered in group circles 810, 820, and 830 based on the corresponding traffic patterns. The group circles 820 and 830 may be labeled (shown as "home" 822 and "all" 832, respectively, in FIG. 8) to indicate information about the content of these circles (e.g., what web pages may be represented in the group circles). Although the group circle 810 may also be labeled, this label may be omitted at this high level view to avoid a cumbersome presentation.

As illustrated in view B of FIG. 8, the interface 850 may present the traffic information of a selected group circle, such as group circle 820. This may allow the interface 850 to bring into focus the selected group circle and to present additional information that may help the user understand the content of the selected group circle. For example, the label of the group circle 810 may be presented in this view (shown as "product" 812 in FIG. 8).

As illustrated in view C of FIG. 8, the interface 850 may further bring into focus a group circle in response to a user selection. As shown, the user may have selected group circle 810 and, accordingly, the interface 850 may expand a view of the group circle 810. In this expanded view, the interface 850 may show additional information about the represented web pages (e.g., web pages 222A and 222B represented by the grayed circles 800A and 800B). When a cursor 860 hovers over a grayed circle representing a web page, such as the grayed circle 800A, the interface 850 may display additional information 802 about the web page, such as a URL and an indication of the traffic volume associated with the web page 222A. An example indication of "6,454" is shown in FIG. 8. This example may correspond to 6,454 visits to the web page 222A. This amount of visits may be appended to the URL. The interface 850 may further allow the user to click on the circle 800A and, in response, may display the web page 222A.

Figure 9:
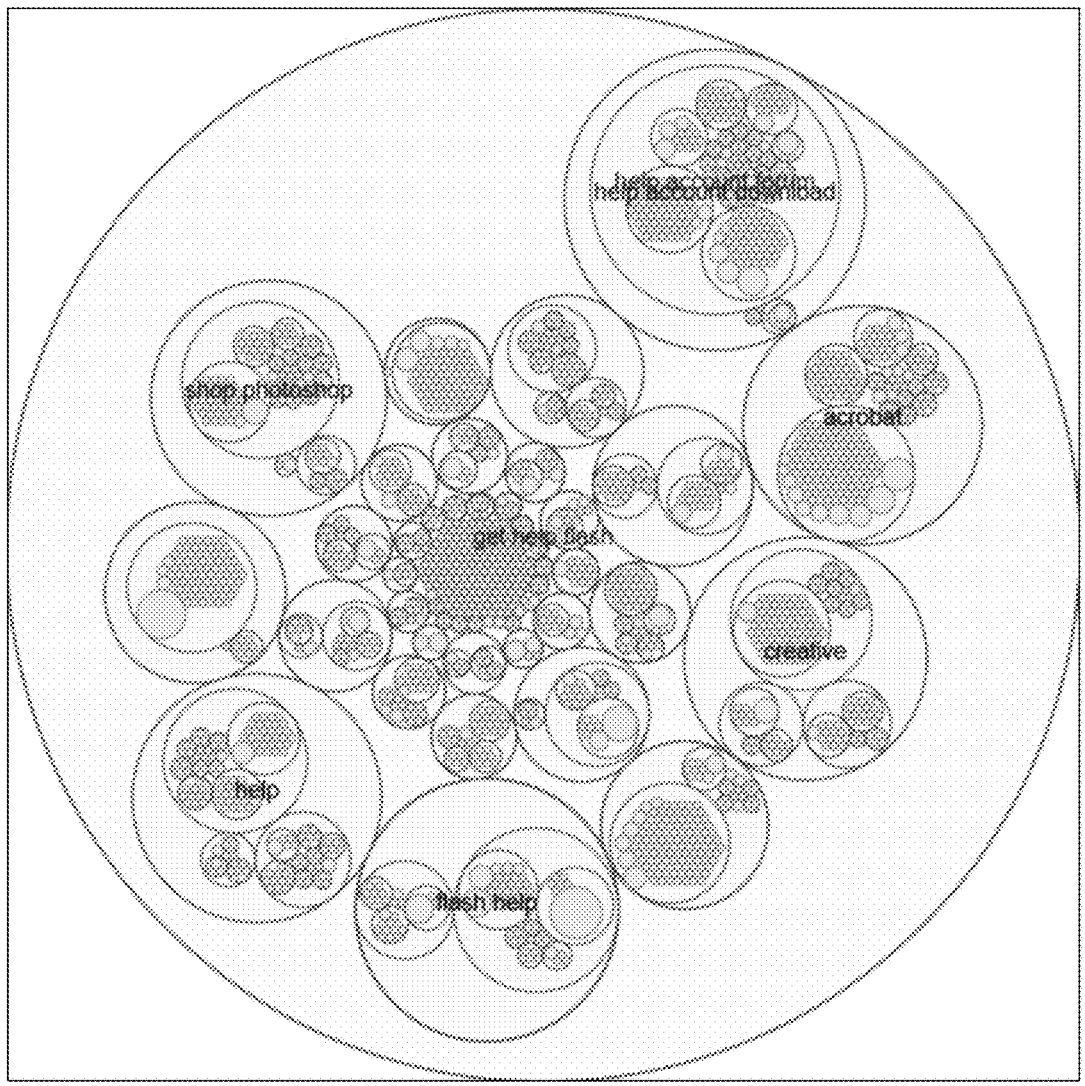
FIG. 9 illustrates an example summary of traffic patterns of a large web site, according to certain embodiment of the present invention.
Figure 10:
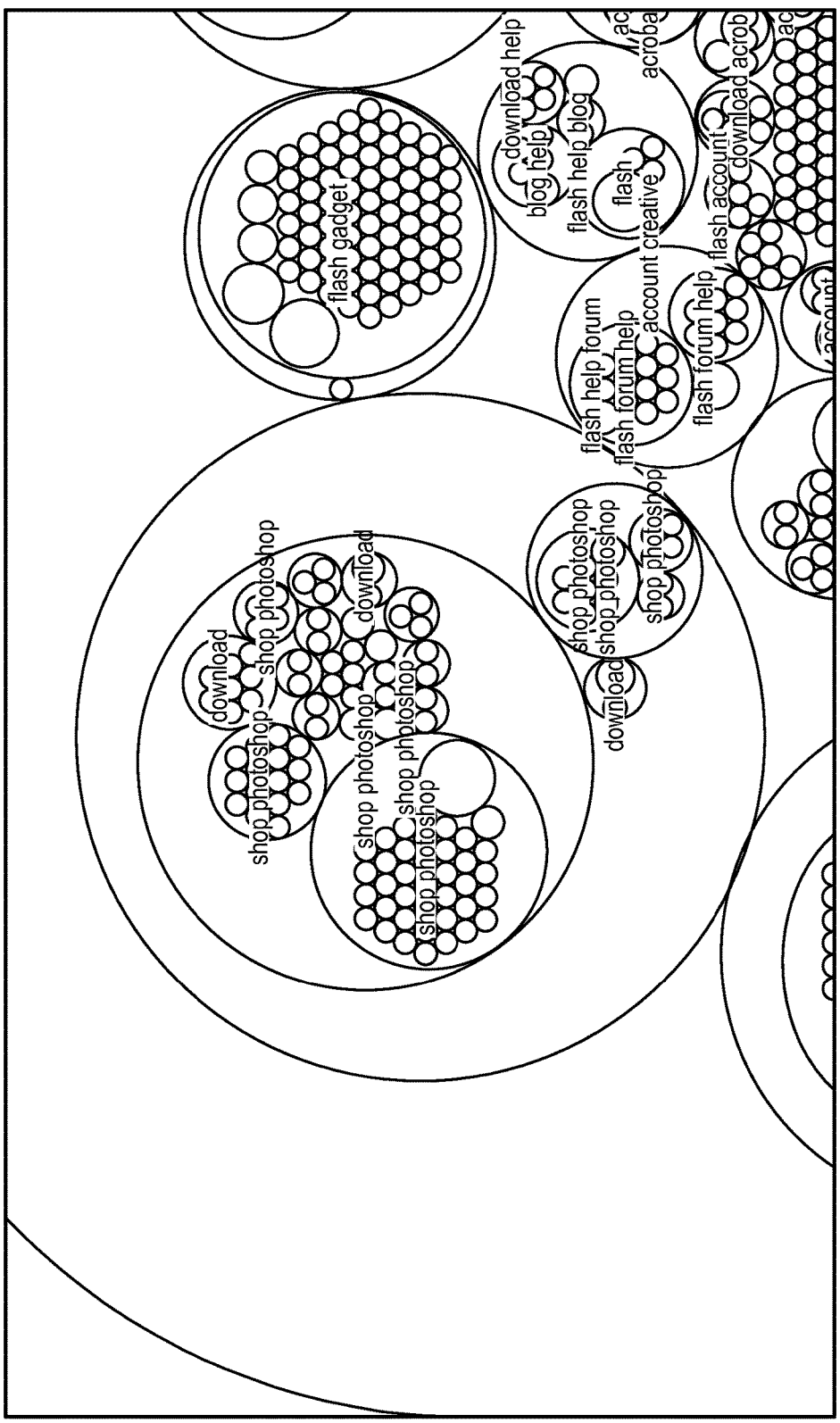
FIG. 10 illustrates an example summary of traffic patterns of a large web site based on an interaction, according to certain embodiment of the present invention.
Figure 11:
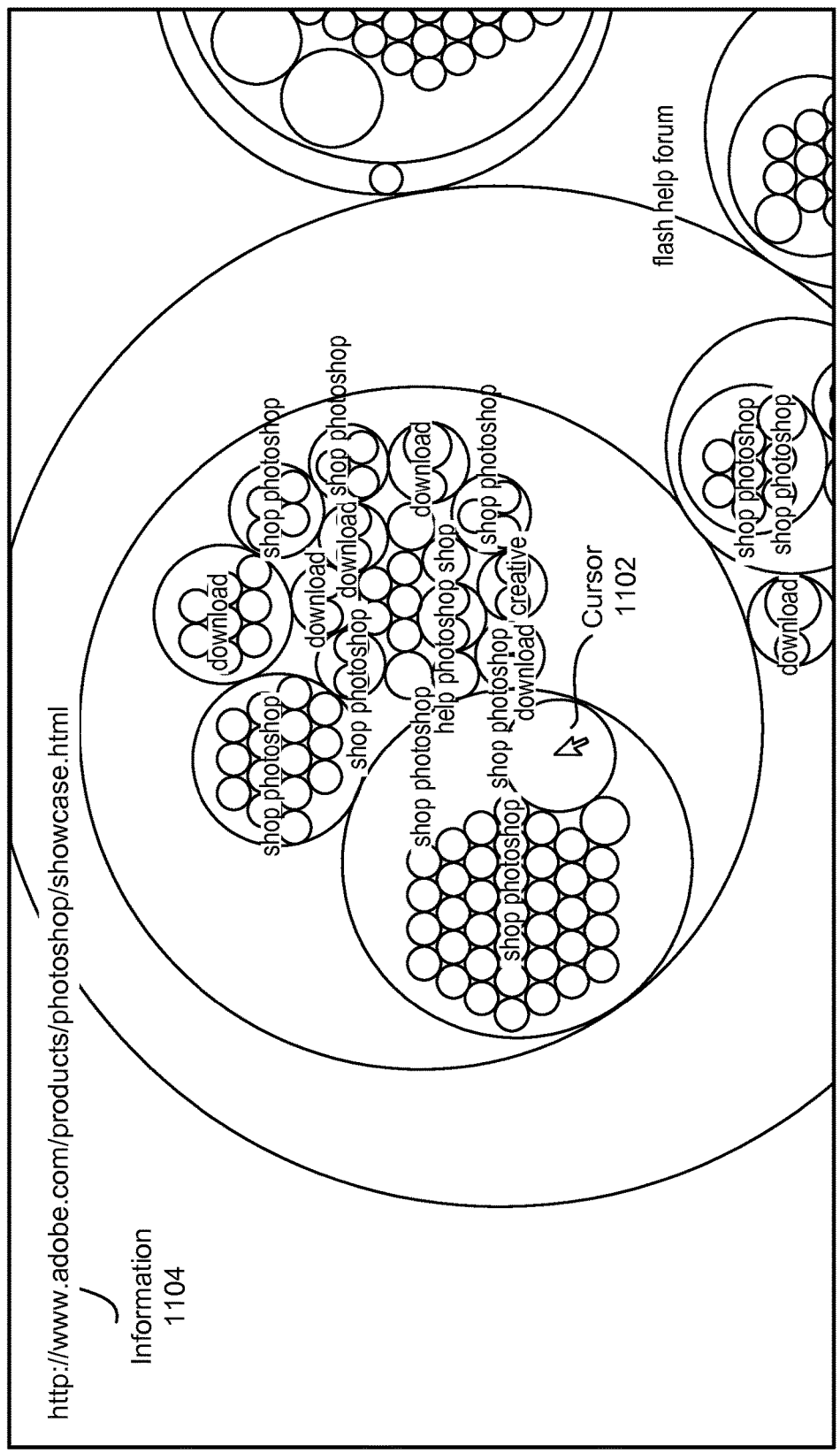
FIG. 11 illustrates another example summary of traffic patterns of a large web site based on an interaction, according to certain embodiment of the present invention.

Although the illustrated example in FIG. 8 uses the web site 220, similar visualization of traffic information may be applied to and presented for any web site, including more complex web sites. FIGS. 9, 10, and 11 present example visualizations of ADOBE.COM, which is a web site that may include around ten thousand unique pages and may receive about thirty million clicks from about ten million visitors every day. As is shown in these figures, even with such a complex web site and large traffic, the embodied techniques may allow an elegant and simple visualization of the traffic information.

Turning to FIG. 9, that figure illustrates the traffic information of the entire ADOBE.COM web site. This may allow a user to perceive on a user interface of a computing device the entire hierarchy of the web site viewed using traffic-based associations between web pages of the web site. Grayed circles may represent individual pages, may be sized based on the respective traffic, and may be recursively clustered in group circles based on respective traffic patterns. A group circle may be labeled based on the represented web pages in that circle. For example, a label "shop photoshop" may be used for a group circle to indicate that the web pages represented in the group circle relate to shopping for Photoshop®, which is an Adobe® product. The labels may allow a user to, for example, identify areas of interest.

Turning to FIG. 10, that figure illustrates the traffic information of one of the group circles, which may cluster a number of circles and represent a number of the web pages. For example, the user may have zoomed in on the group circle labeled with "shop photoshop" and, accordingly, this group circle may have been brought into focus. To zoom in, the user may operate the computing device to select the "shop photoshop" group circle. Various selection techniques may be available including, for example, using a cursor to click on, hover over, click-hold-select an area around, or operate a +/− zooming scale for focusing on the "shop photoshop" group circle. In the focused view, additional information about the circles contained in the "shop photoshop" group circle may be displayed, such as the various labels of the circles. As shown, these labels include, for example, the "shop photoshop" label and a "download" label indicating that the corresponding circles represent either web pages related to shopping for Photoshop® or for downloading Photoshop®.

Turning to FIG. 11, that figure illustrates information about a represented web page. For example, in response to a cursor 1102 hovering over one of the grayed circles, information 1104 about the web page represented by that grayed circle may be presented. As shown, the information 1104 may include the URL of that web page. Additionally, the grayed circle may serve as a link to the web page. As such, when a user clicks on the grayed circle, the web page may be displayed.

Hence, the embodied techniques may allow a summary of a large number of clicks, in the millions or more, on a large number of web pages, in the tens of thousands or more, which make up a website to be communicated in a meaningful and rich way. These techniques may generate a structure by using, for example, an algorithm to detect communities of web pages based on traffic information, use a robust and highly flexible framework to visualize the large number of web pages, and name clusters to help users immediately identify areas of interest.

Figure 12:
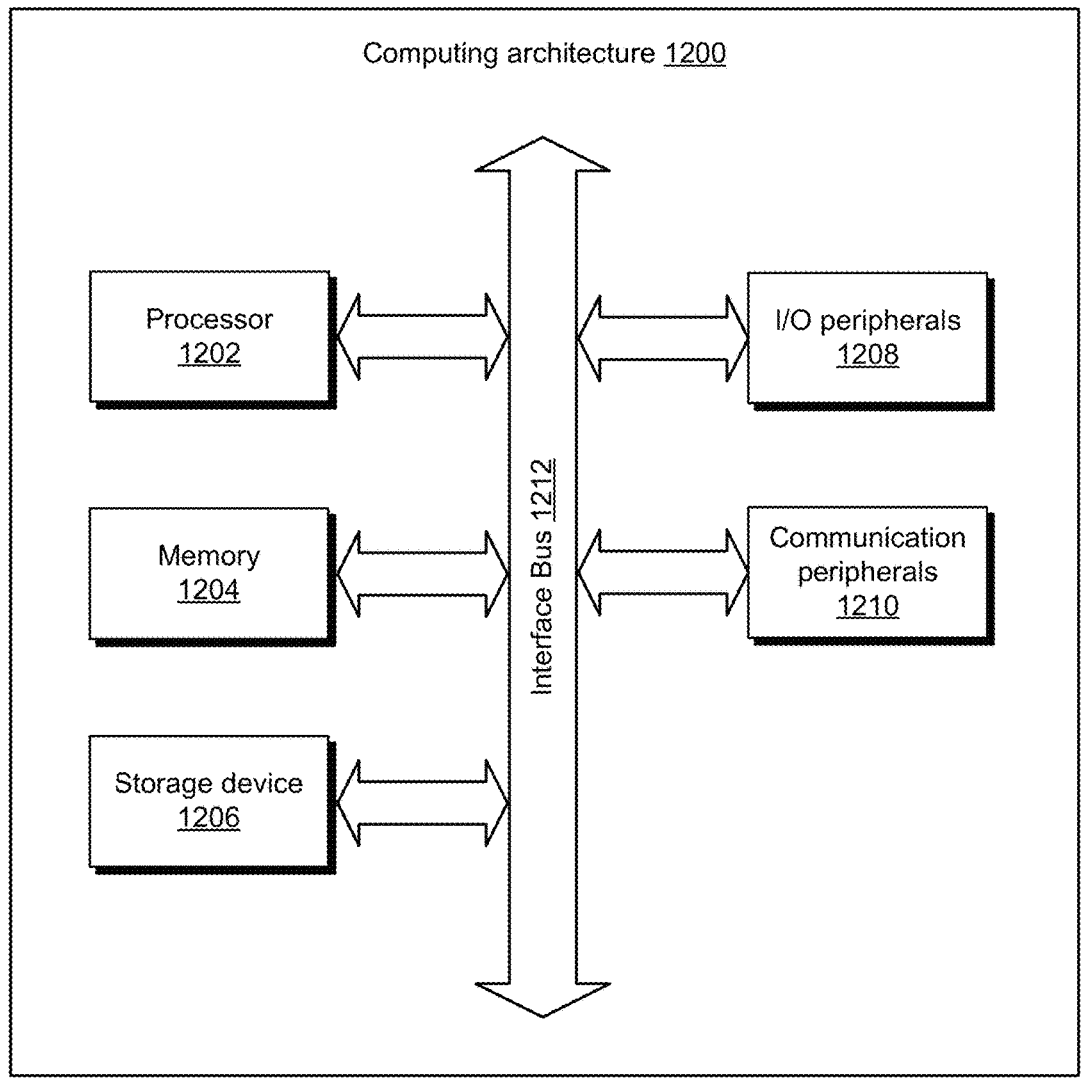
FIG. 12 illustrates an example computing architecture in which various embodiments of the present invention can be implemented.

To implement the various features and functions described herein above, some or all elements of the computing devices and systems (e.g., computing devices 112A-112K and 140 and computing systems 124 and 132 of FIG. 1) may be implemented using components of the computing architecture of FIG. 12. More particularly, FIG. 12 illustrates an example computing architecture 1200 for implementing the techniques in accordance with the present disclosure.

The computing architecture 1200 that may include at least a processor 1202, a memory 1204, a storage device 1206, input/output peripherals 1208, communication peripherals 1210, and an interface bus 1212. The interface bus 1212 may be configured to communicate, transmit, and transfer data, controls, and commands among the various components of the computing architecture 1200. The memory 1204 and the storage device 1206 may comprise computer readable storage media, such as RAM, ROM, electrically erasable programmable read-only memory (EEPROM), hard-drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 1204 and the storage device 1206 may also comprise computer readable signal media. A computer readable signal medium may include a propagated data signal with computer readable program code embodied therein. Such a propagated signal may take any of a variety of forms including, but not limited to, electromagnetic, optical, or any combination thereof. A computer readable signal medium may be any computer readable medium that is not a computer readable storage medium and that can communicate, propagate, or transport a program for use in connection with the computing architecture 1200.

Further, the memory 1204 may comprise an operating system, programs, and applications. The processor 1202 may be configured to execute the stored instructions and can comprise, for example, a logical processing unit, a microprocessor, a digital signal processor, and other processors. The input and output peripherals 1208 may include user interfaces such as a keyboard, screen, microphone, speaker, other input/output devices, and computing components such as graphical processing units, serial ports, parallel ports, universal serial bus, and other input/output peripherals. The input/output peripherals 1208 may be connected to the processor 1202 through any of the ports coupled to the interface bus 1212. The communication peripherals 1210 may be configured to facilitate communication between the computing architecture 1200 and other computing devices over a communications network and may include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method, comprising:
generating a structure for a plurality of web pages of a web site, the structure comprising a plurality of nodes representing the plurality of web pages;
determining a traffic pattern between a first web page, a second web page, and a third web page of the plurality of web pages, the traffic pattern determined based on web traffic information associated with the web site;
generating a visualization of the traffic pattern based on recursive grouping of a plurality of geometric shapes that correspond to the plurality of nodes, wherein generating the visualization comprises:
grouping, into a first group, geometric shapes representing the first web page and the second web page, wherein the grouping is based on the traffic pattern indicating that a volume of web traffic between the first web page and the second web page exceeds a first threshold, the first group having a first geometric shape that contains the geometric shapes;
setting a first size and a first label for the first geometric shape based on the web traffic between the first web page and the second web page; and
grouping, into a second group, the first geometric shape and a a geometric shape representing the third web page, wherein the grouping is based on the traffic pattern indicating that a volume of web traffic between the third web page and web pages in the first group is lower than the first threshold and exceeds a second threshold, wherein the second group has a second geometric shape that includes the first geometric shape of the first group and the geometric shape of the third web page; and
providing the visualization for display in a user interface to indicate the traffic pattern, wherein the visualization simultaneously displays (i) the first geometric shape of the first group as containing the geometric shapes of the first web page and the second web page and (ii) the second geometric shape of the second group as containing the first geometric shape of the first group and the geometric shape of the third web page, wherein the visualization sizes the geometric shape according to the first size and labels the first geometric shape according to the first label.

2. The computer-implemented method of claim 1, wherein the traffic pattern indicates that users navigate between the first web page and the second web page at a frequency that exceeds the first threshold.

3. The computer-implemented method of claim 1, wherein the traffic pattern indicates that the volume of the web traffic between the first web page and the second web page is larger than a volume of web traffic between web pages represented by nodes in the first group and web pages represented by nodes outside of the first group.

4. The computer-implemented method of claim 1, wherein the traffic pattern indicates that a frequency of navigating between the first web page and the second web page is higher than a frequency of navigating between the first web page and the third web page.

5. The computer-implemented method of claim 1, wherein the traffic pattern indicates that a frequency of navigating between the third web page and documents web pages represented by nodes in the first group is higher than a frequency of navigating between the third document web page and documents web pages represented by nodes outside of the second group.

6. A system for providing traffic information associated with a web site, comprising:
a processor;
a memory communicatively coupled to the processor and bearing instructions that, upon execution by the processor, cause the system to at least:
generate a tree structure for a web site based on traffic information associated with web pages of the web site, the tree structure comprising nodes and branches, each node located at a branch and representing a web page;
generate a visualization of the traffic information based on recursive clustering of a plurality of geometric shapes that correspond to the nodes, wherein generate the visualization comprises:
determine a first cluster by identifying first web pages for the first cluster, the first cluster including first nodes from the tree structure, the first nodes representing the first web pages, the first web pages identified based on the traffic information indicating a first frequency of navigation between the first web pages, the first cluster having a first geometric shape that contains first geometric shapes representing the first web pages;
determine a second cluster by identifying second web pages for the second cluster, the second cluster including second nodes from the tree structure, the second nodes representing the second web pages, the second web pages identified based on the traffic information indicating a second frequency of navigation between the second web pages, the second cluster having a second geometric shape that contains second geometric shapes representing the second web pages, and
include the first geometric shape of the first cluster in the second geometric shape of the second cluster based on the traffic information indicating that navigation within the first web pages occurs more frequently than navigation between the first web pages and the second web pages; and
provide the visualization for display, wherein the visualization displays the second geometric shape of the second group as containing the geometric shape of the first group, displays the first geometric shapes in the first geometric shape, and displays the second geometric shapes in the second geometric shape.

7. The system of claim 6, wherein the instructions further comprise that, upon execution by the processor, cause the system to at least:
determine a third cluster by identifying, based on the traffic information, third web pages for the third cluster, the third cluster including third nodes from the tree structure and the first cluster and the second cluster, the third nodes representing the third web pages and having a third geometric shape that contains third geometric shapes representing the third web pages,
wherein the third cluster indicates that navigation between the first web pages and the second web pages occurs more frequently than navigation between the third web pages and the first web pages or the second web pages, and
wherein the third cluster also indicates that navigation between the first web pages, the second web pages, and the third web pages occurs more frequently than navigation between web pages represented by nodes outside of the third cluster and the first web pages, the second web pages, or the third web pages.

8. The system of claim 6, wherein the instructions further comprise that, upon execution by the processor, cause the system to at least:
generate a label for the first cluster based on universal record locators (URLs) of the first web pages.

9. The system of claim 6, wherein the instructions further comprise that, upon execution by the processor, cause the system to at least:
generate a label for a first node of the plurality of the first nodes based on a URL of a corresponding web page and a traffic volume to the corresponding web page.

10. The system of claim 6, wherein the plurality of geometric shapes are displayable at a user interface as clustered, and wherein a size of a displayed geometric shape represents a volume of traffic to at least a web page that corresponds to the geometric shape.

11. A computer-implemented method, comprising:
providing an interface configured to present traffic information associated with a plurality of web pages of a web site; and
causing the interface to present a visualization of the traffic information using a plurality of geometric shapes representative of the plurality of web pages, wherein:
two or more geometric shapes are presented in a first geometric shape of a same first group based on determining that traffic volume between two or more web pages corresponding to the two or more geometric shapes is larger than a first threshold,
a geometric shape is presented in a second geometric shape of a second group and different from the first geometric shape of the first group based on determining that traffic volume between a web page corresponding to the geometric shape and web pages corresponding to geometric shapes presented in the first geometric shapes of the first group is smaller than the first threshold,
the second geometric shape of the second group includes the first geometric shape of the first group based on the determining that traffic volume between web pages corresponding to geometric shapes presented in the second geometric shape of the second group and not in the first geometric shape of the first group and the web pages corresponding to the geometric shapes presented in the first geometric shape of the first group is larger than a second threshold, and
the visualization displays the second geometric shape of the second group as containing the first geometric shape of the first group and displays the plurality of geometric shapes.

12. The computer-implemented method of claim 11, wherein the geometric shapes presented in the second geometric shape of the second group and not the first geometric shape of the first group are added to the second geometric shape of the second group based on determining that traffic volume between the web pages corresponding to the geometric shapes presented in the second geometric shape of the second group and not the first geometric shape of the first group exceeds the first threshold.

13. The computer-implemented method of claim 11, further comprising:
presenting a label of the first group on the interface, wherein the label of the first group comprises a description of a plurality of web pages associated with the first group, wherein the description is determined based on universal record locators (URLs) of the web pages and comprises a selection of one or more tags from the URLs, and wherein the one or more tags are selected based on one or more frequencies of use of the one or more tags in the URLs.

14. The computer-implemented method of claim 11, further comprising:
in response to a user selection of the geometric shape of the first group, expanding a presentation of the first geometric shape of the first group on the interface.

15. The computer-implemented method of claim 11, further comprising:
in response to a user selection of a geometric shape representing a web page, causing the interface to present information about the web page.

16. The computer-implemented method of claim 15, wherein the information about the web page comprises a URL of the web page and a value of a traffic volume associated with the web page, wherein the value is appended to the URL of the web page.

17. The computer-implemented method of claim 1, wherein providing the visualization for display comprises providing an interactive interaction with the visualization, wherein the interactive interaction comprises:
in response to a user selection of the second geometric shape of the second group, providing for display the second geometric shape of the second group based on a second size and a second label of the second geometric shape, and providing for display the first geometric shape of the first group based on the first size and the first label;
in response to a user selection of the first geometric shape of the first group, providing for display the first geometric shape of the first group absent of the second geometric shape of the second group, and providing for display the geometric shapes and information about the web traffic between the first web page and the second web page; and
in response to a user selection of a geometric shape representing the first web page, providing for display information about the first web page and information about web traffic to the first web page.

18. The computer-implemented method of claim 1, wherein setting the first label comprises:
determining a tag from a uniform resource locator (URL) of the first web page;
determining that the tag is also found in a URL of the second web page; and
adding the tag to the first label.

19. The computer-implemented method of claim 1, wherein setting the first label comprises:
determining a first tag from a uniform resource locator (URL) of the first web page;
determining a second tag from a URL of the second web page; and
adding the first tag and not the second tag to the first label based on a determination that that the first web page has a higher volume of traffic than the second web page.

20. The computer-implemented method of claim 1, wherein the geometric shapes of the first web page and the second web page have a different color than the first geometric shape of the first group, and wherein an opacity of a geometric shape of the first web page is set based on traffic to the first web page.

* * * * *